June 16, 1936.     R. S. TROTT     2,044,713
ENGINE MOUNTING
Original Filed July 13, 1932    2 Sheets-Sheet 1

Inventor
Rolland S. Trott
By Lenore E. Hodges
Attorney

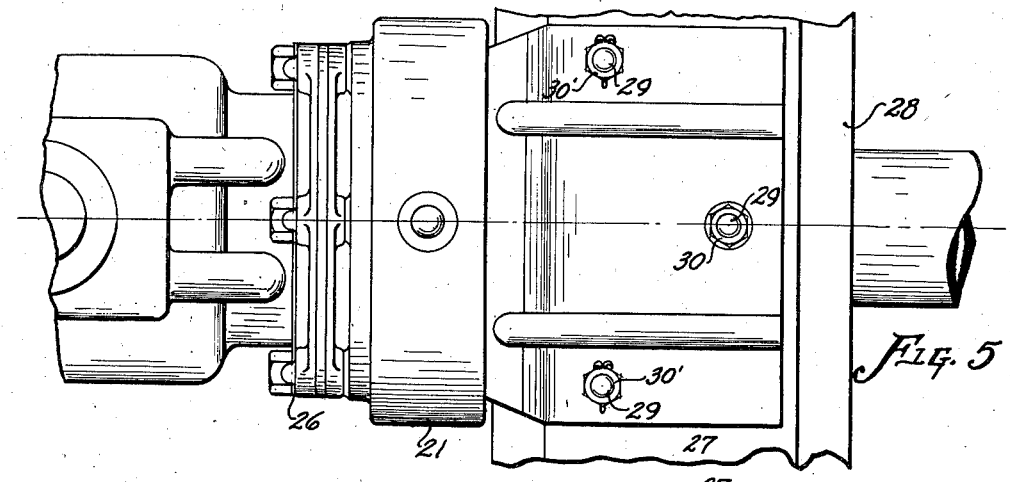
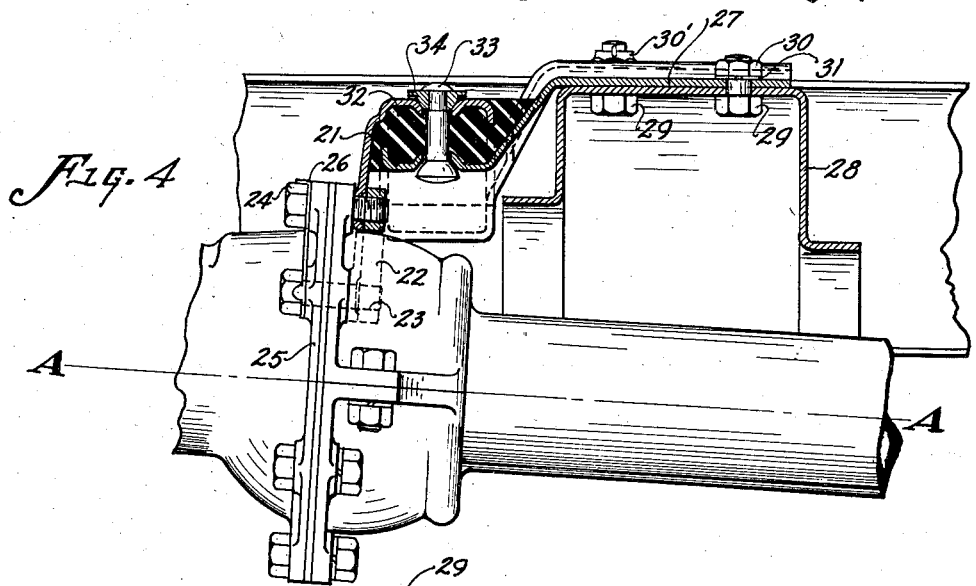
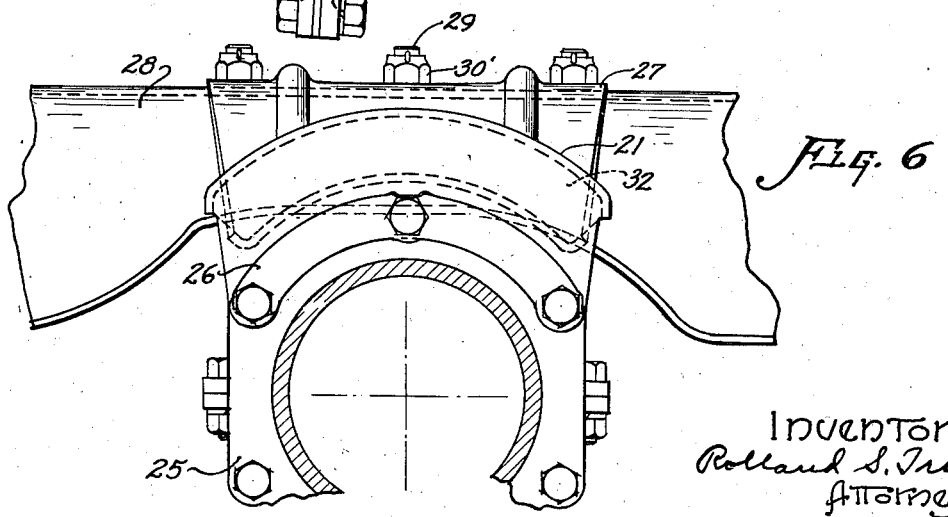

Patented June 16, 1936

2,044,713

UNITED STATES PATENT OFFICE 2,044,713

ENGINE MOUNTING

Rolland S. Trott, Denver, Colo.

Original application July 13, 1932, Serial No. 622,330. Divided and this application March 25, 1933, Serial No. 662,855

13 Claims. (Cl. 248—7)

This invention relates to an improvement in engine mountings, and is a division of my application Serial No. 622,330, filed July 13, 1932, on Engine mountings.

It is a known fact that an engine unit mounted on soft thick rubber mountings tends to roll on the rubber about an axis within the rubber itself, when operated at slow speed. When the engine is operated at high speed, the amplitude of oscillation is less, and the inertia of the oscillating engine together with the restraining influence of the soft thick rubber combine to locate the pivot point of the engine approximately coincident with the geometrical center of the soft thick rubber mounting.

My present invention is an engine mounting which is disposed above the crank-shaft axis of the engine and mounts an end portion of the engine for oscillatory movement about a longitudinally extending axis. It was designed primarily as a rear mounting for the engine and comprises an arcuate strip of non-metallic resilient material so arranged that the axis of oscillation approaches said mounting at slow speed and as the axis rises toward said mounting it likewise rises toward the center of weight of the engine, thereby to diminish vibration incident to the operation of the engine. For high-speed running, the axis of oscillation may be disposed considerably below the center of weight with satisfactory results, but at slow speed the axis changes or rises so that by locating the mounting above the axis of the crank-shaft the rise of the axis of oscillation toward the rubber from the theoretical center of the rubber allows the axis of oscillation to approach or pass through the center of weight, thereby materially reducing the vibrations incident to the operation of the engine, particularly at slow speed where maximum vibration is normally obtained.

In the accompanying drawings:

Fig. 4 is a section partly in elevation showing another form of rear mounting structure applied;

Fig. 5 is a plan view of the form shown in Fig. 4; and

Fig. 6 is a vertical sectional view of the same.

Figure 1:
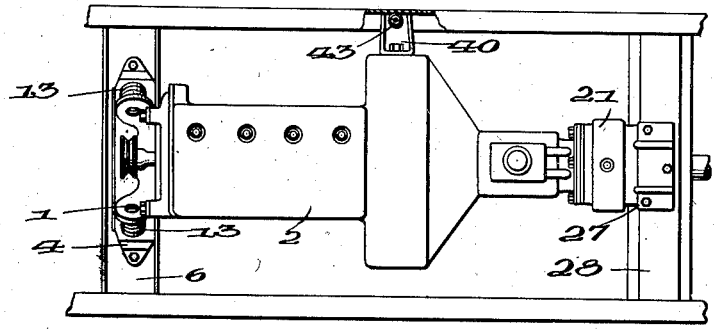
Fig. 1 is a plan view showing my invention applied to the support of the rear end portion of an engine unit.

Referring to Fig. 1, an engine unit is designated generally by the numeral 2, and at its front end it has a cradle 1 attached thereto and supported on inclined coil-springs 13, the lower ends of which rest on a pillow 4 carried by a cross-frame member 6 as set forth more in detail in my application Serial No. 622,330, filed July 13, 1932. A stabilizing connection may be attached to one side of the engine, if desired, and for that purpose I show a bracket 40 having one or more coil springs 43 interposed between the end thereof and the frame.

In the rear mounting the cradle 21 (see Figure 4) is provided with the arc member 22 which is provided with the threaded holes 23 to receive the cap-screws 24 of the universal joint housing 25. The arc member 22 is welded or in any other proper manner attached to the cradle 21. The thin arc washer 26 positioned under the heads of the cap screws 24 is to be bent against the faces of the cap-screws 24 to lock them in place. The pillow member 27 is bolted to the cross-member 28 of the frame by the bolts 29, nuts 30 and lockwashers 31, or castle nuts 30′ may be employed. The rubber member 32 is carried by the pillow member 27 and in turn carries the cradle 21.

Rebound of the rear of the engine unit with respect to the pillow member 27 is prevented (see Figure 4) by the spherical faced head of the rivet 33 and by the spherical faced washer 34. The spherical faces of the rivet head and of the washer fit in spherical seats of the pillow member 27 and of the cradle 21 respectively. If desired, the rebound rivet 33 may be dispensed with and the rubber member 32 may be vulcanized to the cradle 21 and to the pillow 27 and the bond between the rubber and the metal alone relied upon to prevent the rebound of the cradle 21 upward away from the pillow 27.

Instead of the cradle 21 being attached to the rear of the engine unit as shown, any other proper means or construction for attaching the cradle to any part of the rear of the engine unit may be used or the cradle 21 may, if desired, be made integral with or attached to any part of the rear of the engine unit as it is manufactured. The pillow member 27 may be attached to the cross-member 28 or to the frame of the vehicle in any other proper manner or may be made as an integral part thereof if desired.

Any of the above variations may be employed so long as the final result is a mounting which provides substantially pivotal movement substantially concentric with the crankshaft axis A—A of the engine unit and which accommodates for the movements provided for the front end of the engine unit while at the same time providing some slight transverse, vertical, horizontal or mixed movements.

Figure 2:
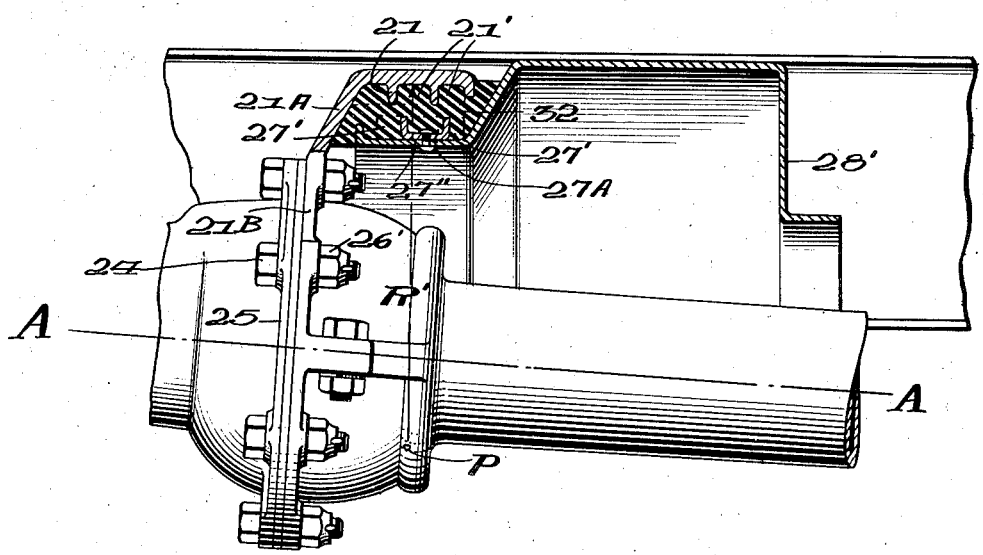
Fig. 2 is a side elevation partly in section, showing the invention applied.

In Fig. 2 the rubber member 32 is made on a greater radius as R' and is adapted to receive indents 21' and 27' of the parts 21A and 27" respectively for the purpose of combining with the increased radius to provide increased resilient resistance to the pivotal movement of the engine unit, the part 27" being welded, riveted or otherwise made in effect integral with the frame part 28'. The indents shown will increase this resilient resistance whether or not the rubber member 32 is vulcanized to one, both or neither of the co-acting parts. The flanges 21" and 27A act to provide additional resilient resistance to relative end motion of the parts 21A and 28'. The part 21A is an integral part of the universal joint housing 21B and is held in place by the bolts 24 and castle nuts 26'. The rubber member 32 in Figure 2 is shown in slightly unconventional fashion for the sake of clearance.

Figure 3:
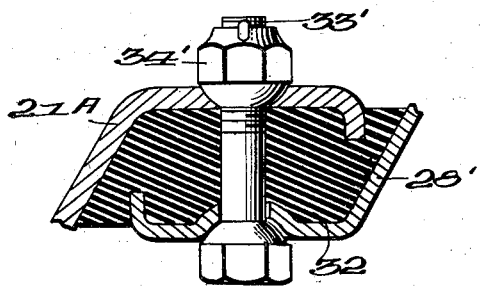
Fig. 3 is a detail sectional view showing a slightly different mounting structure.

In Figure 3 the bolt 33' with a spherical faced head has a tight fit through a hole in the rubber 32 and has ample clearance with the inner peripheries of the spherical sockets in the members 21A and 28'. The spherical faced castle nut 34' is screwed down to just bring the parts in contact before the load of the rear of the engine unit is put upon the rubber 32. When the rubber is then loaded, its slight resulting compression will allow either of the spherical faces of the bolt 33' or of the nut 34' to clear its coacting spherical seat. Thus the bolt 33' and nut 34' will be normally inactive and in contact with the rubber 32 only while still acting to prevent any abnormal excessive upward movement of the rear of the engine unit with respect to the frame.

In Figure 2 it will be seen that the arc member 22 is dispensed with since the cradle member 21A is now made integral with the universal joint housing 21B, by placing the rubber of the rear mounting above and concentric with the axis of the engine crank-shaft as shown in Figures 4, 5 and 6. Then as the pivot point moves toward the rubber as the speed decreases it will move upward above the crank-shaft axis A—A.

By placing the rubber of the rear mounting above the axis A—A in Figure 2 with the theoretical pivot point at, say, the point P, below the axis A—A, the pivot point, as it approaches the rubber as the speed decreases, will by proper proportioning be made to be on the axis A—A on slow hard pulls. The designer may select either of these constructions or any combination and proportion of them to best suit the requirements of any particular design of engine unit.

By the design and disposition of my mountings proper transverse and orbital movement of the engine unit may be permitted, and also substantially pivotal or oscillatory movement. The amount of resilient resistance to such oscillatory movement may be varied by variations in the mounting structures which are well understood. My mounting may be applied either as an accessory or in factory production.

I claim:

1. A mounting for a portion of an engine unit having a tendency to oscillatory movement during operation about a longitudinal axis, comprising supporting means adapted to be attached to a chassis, supporting means adapted to be attached to an engine unit, and an arc of non-metallic resilient material arranged between the respective supporting means above said axis of oscillation with the center of said arc disposed below said arc of material in position to provide for the approach of the axis of oscillation toward the resilient material as the speed of the engine is slowed.

2. A mounting for a portion of an engine unit having a tendency to oscillatory movement during operation about a longitudinal axis, comprising supporting means adapted to be attached to a chassis, supporting means adapted to be attached to an engine unit, and an arc of non-metallic resilient material arranged between the respective supporting means above said axis of oscillation with the center of said arc below the axis of the crankshaft of the engine, said material being so arranged that the axis of oscillation tends to approach the resilient material as the speed of the engine is slowed.

3. A mounting for a portion of an engine unit having a tendency to oscillatory movement during operation about a longitudinal axis, comprising supporting means adapted to be attached to a chassis, supporting means adapted to be attached to an engine unit, and an arc of non-metallic resilient material less than a semi-circle arranged between the respective supporting means in inverted position above the axis of the crankshaft of the engine with the center of said arc below the axis of the crankshaft of the engine, so that the axis of oscillation tends to approach said arc of material as the speed of the engine is slowed.

4. A mounting for a portion of an engine unit having a tendency to oscillatory movement about a longitudinal axis during operation, comprising supporting means adapted to be attached to a chassis, supporting means adapted to be attached to an engine unit, and an arc of non-metallic resilient material less than a semi-circle arranged between the respective supporting means in inverted position above the axis of oscillation of the engine with the center of said arc of resilient material at said axis of oscillation at high speed and said arc of resilient material being so arranged that the axis of oscillation tends to approach the resilient material at slow speed.

5. A mounting for a portion of an engine unit having a tendency to oscillatory movement about a longitudinal axis during operation, comprising supporting means adapted to be attached to a chassis, supporting means adapted to be attached to an engine unit, and an arc of non-metallic resilient material arranged between the respective supporting means above the axis of the crankshaft of the engine and having the vertical longitudinal plane of said crankshaft axis passing through said arc of resilient material, said resilient material being so constructed and arranged as to locate the axis of oscillation therebelow at high speed and to provide for the approach of the axis of oscillation toward said resilient material at slow speed of the engine.

6. A mounting for a portion of an engine unit comprising a cradle having a portion adapted to be secured to a portion of the engine unit, a pillow having a portion adapted to be secured to a frame, said pillow and cradle having opposed arcuate portions at the lower and upper edges respectively thereof overlapping horizontally and spaced apart vertically, and an arc of non-metallic resilient material disposed between said arcuate portions and secured thereto.

7. A mounting for a portion of an engine unit comprising a cradle having an upstanding portion adapted to be secured to a portion of the engine unit, a pillow having a portion adapted to be secured to a frame and having an arcuate portion offset from the lower edge thereof, the cradle having an arcuate portion offset from the upper edge thereof in overlapping parallel relation with the arcuate portion of the pillow, and an arc of non-metallic resilient material fitted between said overlapping arcuate portions.

8. A mounting for a portion of an engine unit comprising a cradle having an upstanding portion adapted to be secured to a portion of the engine unit, a pillow having a portion adapted to be secured to a frame and having an arcuate portion offset from the lower edge thereof, the cradle having an arcuate portion offset from the upper edge thereof in overlapping parallel relation with the arcuate portion of the pillow, an arc of non-metallic resilient material fitted between said overlapping arcuate portions, and means for holding the overlapped portions and resilient material against substantial separation and for checking the rebound of the supported portion of the engine unit.

9. A mounting for a portion of an engine unit having a tendency to oscillatory movement during operation about a longitudinal axis, comprising a pillow having a portion adapted to be secured to a frame, a cradle having a portion adapted to be secured to a portion of the engine unit, said pillow and cradle having opposed arcuate portions at the lower and upper edges respectively thereof overlapping horizontally and spaced apart vertically, and an arc of non-metallic resilient material secured between said arcuate portions in inverted position above the axis of oscillation of the engine unit with the center of said arc of resilient material below the crankshaft axis of the engine unit and providing for the approach of the axis of oscillation toward the resilient material at slow speed.

10. A mounting for a portion of an engine unit having a tendency to oscillatory movement during operation about a longitudinal axis having a desired position approximately at the crankshaft axis of the engine unit for hard pulling at slow speed, comprising an arc of non-metallic resilient material having means of attachment to said engine unit and to a chassis respectively, said arc of resilient material being arranged to face said desired position of the axis of oscillation with the geometrical center of said arc on the remote side of said desired position from said resilient material.

11. In a motor vehicle having a frame, and an engine unit having a tendency to oscillatory movement during operation about a longitudinal axis, the combination with said engine unit having a crankshaft, of means mounting said engine unit on the frame, said mounting means comprising an arc of non-metallic resilient material carried by the frame and connected with the engine unit, said arc being arranged in inverted position above the axis of oscillation with the geometrical center thereof below the axis of the crankshaft.

12. In a motor vehicle having a frame, and an engine unit having a crankshaft and having a tendency to oscillatory movement during operation about a longitudinal axis, the combination with said engine unit, of means mounting said engine unit on the frame, said mounting means comprising an arc of non-metallic resilient material carried by the frame and connected with the engine unit, said arc being arranged in inverted position above the axis of the crankshaft with the geometrical center of said arc below the crankshaft axis.

13. In a motor vehicle having a frame, and an engine unit having a crankshaft and having a tendency to oscillatory movement during operation about a longitudinal axis, the combination with said engine unit, of means mounting said engine unit on the frame, said mounting means comprising an arc of non-metallic resilient material carried by the frame and connected with the engine unit, said arc being arranged in inverted position above the axis of the crankshaft with the geometrical center of said arc below the crankshaft axis, and said resilient material being relatively thick and soft, whereby the pivot point provided by said resilient material approaches the crankshaft axis as the engine speed decreases.

ROLLAND S. TROTT.